(12) United States Patent  (10) Patent No.: US 7,483,077 B2
Wyman et al.  (45) Date of Patent: Jan. 27, 2009

(54) METHOD AND SYSTEM FOR CONTROL OF A MULTI-FIELD DEINTERLACER INCLUDING PROVIDING VISUALLY PLEASING START-UP AND SHUT-DOWN

(75) Inventors: Richard H. Wyman, Sunnyvale, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 709 days.

(21) Appl. No.: 10/945,729

(22) Filed: Sep. 21, 2004

(65) Prior Publication Data

US 2005/0168634 A1  Aug. 4, 2005

Related U.S. Application Data

(60) Provisional application No. 60/540,760, filed on Jan. 30, 2004.

(51) Int. Cl.
*H04N 7/01* (2006.01)
(52) U.S. Cl. ...................................... 348/452
(58) Field of Classification Search .......... 348/448, 348/449, 451, 452, 458, 459, 700, 558
See application file for complete search history.

(56) References Cited

U.S. PATENT DOCUMENTS

| 4,400,719 | A | | 8/1983 | Powers | |
|---|---|---|---|---|---|
| 5,682,205 | A | * | 10/1997 | Sezan et al. ................. | 348/452 |
| 6,069,664 | A | | 5/2000 | Zhu et al. | |
| 6,118,491 | A | | 9/2000 | Wu et al. | |
| 6,160,586 | A | * | 12/2000 | Justiss et al. ................. | 348/452 |
| 6,618,094 | B1 | * | 9/2003 | De Haan et al. ............. | 348/448 |
| 6,832,295 | B1 | * | 12/2004 | Stonecypher ............... | 711/135 |
| 7,142,246 | B2 | * | 11/2006 | Chen et al. .................... | 348/448 |
| 7,170,561 | B2 | * | 1/2007 | Winger et al. ............... | 348/448 |
| 2003/0052995 | A1 | | 3/2003 | Hsu et al. | |
| 2003/0112369 | A1 | * | 6/2003 | Yoo et al. .................... | 348/448 |
| 2003/0122961 | A1 | * | 7/2003 | Li ............................... | 348/448 |
| 2005/0074060 | A1 | * | 4/2005 | Lien .......................... | 375/240 |

FOREIGN PATENT DOCUMENTS

EP  0790737  8/1997

* cited by examiner

*Primary Examiner*—Paulos M Natnael
(74) *Attorney, Agent, or Firm*—McAndrews, Held & Malloy, Ltd.

(57) ABSTRACT

In a video system, a method and system for control of a multi-field deinterlacer including visually pleasing start-up and shut-down are provided. During a hard start, a deinterlacer may deinterlace a first received field and provide the resulting frame for display until sufficient fields are received to generate a pixel constellation for deinterlacing subsequent received fields. The deinterlacer may also provide a constant frame for display until sufficient fields are received to generate the pixel constellation. During normal operation, the deinterlacer may mitigate the effects of a discrepancy as to the received field type. When a video source is jittery or there is uncertainty as to the field type, deinterlacing may be forced to be based on spatial information. When a video source is shut off, a portion of the remaining stored fields may be flushed. At least one of the flushed fields may be deinterlaced and displayed.

30 Claims, 13 Drawing Sheets

METHOD AND SYSTEM FOR CONTROL OF A MULTI-FIELD DEINTERLACER INCLUDING PROVIDING VISUALLY PLEASING START-UP AND SHUT-DOWN

CROSS-REFERENCE TO RELATED APPLICATIONS/INCORPORATION BY REFERENCE

This patent application makes reference to, claims priority to and claims benefit from U.S. Provisional Patent Application Ser. No. 60/540,760 filed on Jan. 30, 2004.

This application makes reference to:
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,796 filed Sep. 21, 2004;
U.S. application Ser. No. 10/945,817 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17. 2004;
U.S. application Ser. No. 10/946,153 filed Sep. 21, 2004; and
U.S. application Ser. No. 10/945,645 tiled Sep. 21, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for controlling a multi-field deinterlacer including providing visually pleasing startup and shutdown.

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced, while for some computer signals the scanning may be progressive or non-interlaced. Interlaced video occurs when each frame is divided into two separate sub-pictures or fields. These fields may have originated at the same time or at subsequent time instances. The interlaced picture may be produced by first scanning the horizontal lines for the first field and then retracing to the top of the screen and then scanning the horizontal lines for the second field. The progressive, or non-interlaced, video may be produced by scanning all of the horizontal lines of a frame in one pass from top to bottom.

In video compression, communication, decompression, and display, there has been for many years problems associated with supporting both interlaced content and interlaced displays along with progressive content and progressive displays. Many advanced video systems support either interlaced or progressive video but not both. As a result, deinterlacers, devices or systems that convert interlaced video into progressive video, have become an important component in many video systems. The deinterlacer may take the available lines from a current field and may determine the remaining lines needed to fill the progressive output frame. The process of deinterlacing may be seen as taking one present line of pixels from the source field and producing two output lines of pixels. One line is the line that came from the source field and may be called the "present" line, while the other line is the line that needs to be created and may be called the "absent" line. Interlaced fields may be of two types, top fields and bottom fields. Top fields may have a present line as their first line and bottom fields may have an absent line as their first line. The sequence of fields in interlaced video alternate between top fields and bottom fields.

Field-by-field control of a deinterlacer which relies on multiple fields to generate progressive video may involve many complex operations. Performing all the state control in software may allow flexibility when carrying out these complex operations but it may also require a significant amount of state information to be maintained over many fields. This may require a large amount of memory which may be cost prohibitive. Moreover, many of these operations straddle multiple fields making clean software partitioning challenging. The process of enabling and disabling a multi-field deinterlacer in the display path may be a non-trivial task and may cause unwanted artifacts to be displayed. Furthermore, a way in which a change in time reference or video source availability is handled is crucial to enabling and disabling the deinterlacer in a visually pleasing manner.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for video signal processing. Aspects of the method may comprise determining if a sufficient number of fields have been received to generate a pixel constellation for deinterlacing. If an insufficient number of fields have been received, repeating display of a particular frame may be performed until sufficient number of fields are available to generate the pixel constellation for deinterlacing. The particular frame may be a constant frame in which every pixel has the same value, and may be either generated or retrieved from a memory. The method may also comprise receiving a first field from a video source, deinterlacing the first received field, and displaying the deinterlaced first received field until sufficient fields have been received and stored to generate the pixel constellation for deinterlacing.

The effects of a discrepancy between a provided field type for a received field and an expected field type for the received field may be mitigated until a sufficient number of fields have been received and stored to generate the pixel constellation. When a video source has jitter or when there is uncertainty as to whether the received field is a bottom field or a top field, deinterlacing may be based on spatial information. When the video source is shut off, at least a portion of the stored fields which remain after the video source is shut off may be flushed. At least one of the flushed fields may be deinterlaced and displayed, where the deinterlacing of the flushed field is based on spatial information.

Another embodiment of the invention may provide a machine-readable storage, having stored thereon, a computer program having at least one code section executable by a machine, thereby causing the machine to perform the steps as described above for video signal processing.

Aspects of the system may comprise a motion adaptive deinterlacer that determines if a sufficient number of fields have been received to generate a pixel constellation for deinterlacing. If an insufficient number of fields have been received, the motion adaptive deinterlacer may repeat for display a particular frame until sufficient number of fields are available to generate the pixel constellation for deinterlacing. The particular frame may be a constant frame in which every pixel has the same value, and may be either generated or retrieved from a memory by at least one processor. The motion adaptive deinterlacer may receive a first field from a video source, deinterlace the first received field, and display the deinterlaced first received field until sufficient fields have been received and stored to generate the pixel constellation for deinterlacing.

The processor may mitigate the effects of a discrepancy between a provided field type for a received field and a field type for the expected field when a sufficient number of fields have been received and stored to generate the pixel constellation. When a video source has jitter or when there is uncertainty as to whether the received field is a bottom field or a top field, the motion adaptive deinterlacer may deinterlace based on spatial information. When the video source is shut off, the processor may flush at least a portion of the stored fields which remain after the video source is shut off. The motion adaptive deinterlacer may deinterlace and display at least one of the flushed fields, where the deinterlacing of the flushed field is based on spatial information.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for controlling a multi-field deinterlacer including providing visually pleasing startup and shutdown. The method and system may comprise a plurality of algorithms and architectures for a motion adaptive deinterlacer (MAD) which may be utilized in a video network (VN). The algorithms and architectures for the MAD may be adapted to acquire interlaced video fields from one of a plurality of video sources in the video network and convert the acquired interlaced video fields into progressive frames in a visually pleasing manner. Certain aspects of the invention may provide flexibility when carrying out the complex operations of a multi-field deinterlacer and may also provide an efficient manner for maintaining a significant amount of state information over many fields. Moreover, efficient and flexible software and architectural partitioning for operations that straddle multiple fields, for example, a hard start, a normal operation, a force spatial, and a flush operation, may be provided.

Figure 1:
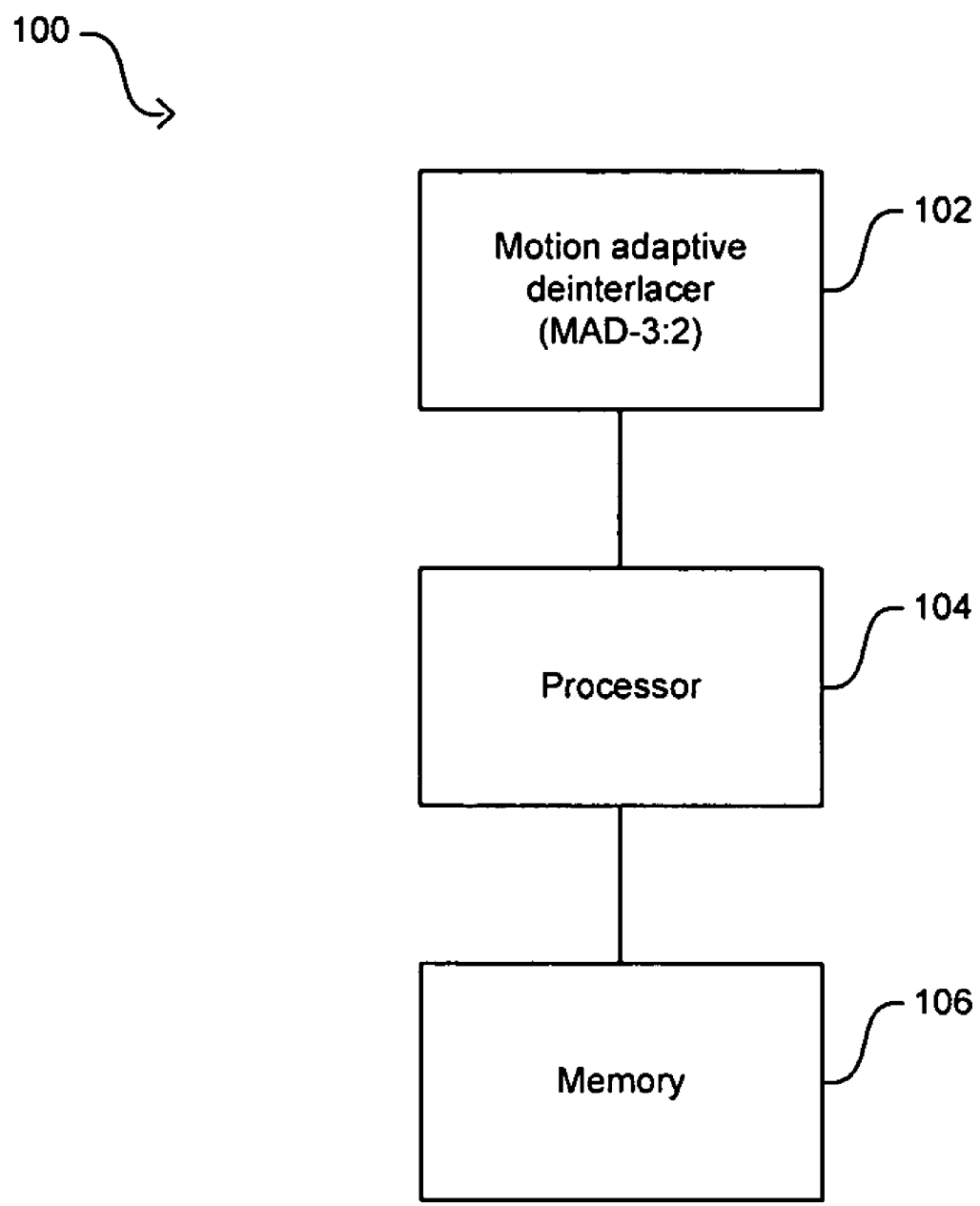
FIG. 1 illustrates a block diagram of an exemplary system for controlling a multi-field deinterlacer including providing visually pleasing startup and shutdown, in accordance with an embodiment of the invention.

FIG. 1 illustrates a block diagram of an exemplary system for controlling a multi-field deinterlacer including providing visually pleasing startup and shutdown, in accordance with an embodiment of the invention. Referring to FIG. 1, the deinterlacer system 100 may comprise a motion adaptive deinterlacer, such as a motion adaptive deinterlacer with reverse 3:2 pulldown (MAD-3:2) 102, a processor 104, and a memory 106. The MAD-3:2 102 may comprise suitable logic, code, and/or circuitry that may be adapted to deinterlace video fields. The processor 104 may comprise suitable logic, code, and/or circuitry that may be adapted to control the operation of the MAD-3:2 102, to perform the operation of the MAD-3:2 102, and/or to transfer control information and/or data to and from the memory 106. The memory 106 may comprise suitable logic, code, and/or circuitry that may be adapted to store control information, data, information regarding current video fields, and/or information regarding prior video fields.

The MAD-3:2 102 may be capable of reverse 3:2 pull-down and 3:2 pull-down cadence detection which may be utilized in a video network (VN). The MAD-3:2 102 may be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input from a video bus (VB) and output deinterlaced, progressive video to the video bus (BUS) utilized by the video network. The MAD-3:2 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field by field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the invention, five fields of video may be utilized to determine motion.

The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-3:2 102 may provide reverse 3:2 pull-down for improved quality from film based sources. The MAD-3:2 102 may also be adapted to support a variety of sources.

In operation, the MAD-3:2 102 may receive interlaced fields and may convert those deinterlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106.

The processor 104 may control the operation of the MAD-3:2 102. For example, the processor 104 may select from a plurality of deinterlacing algorithms, a deinterlacing algorithm that may be utilized by the MAD-3:2 102. The processor 104 may be adapted to modify the MAD-3:2 102 based on a corresponding source of the video fields. Moreover, the processor 104 may transfer to the MAD-3:2 102, information stored in the memory 106. The processor 104 may also transfer to the memory 106, any field-related information not locally stored in the MAD-3:2 102. The MAD-3:2 102 may then use information from the current field, information from previously occurring fields, and information from fields that occurred after the current field, to construct a pixel constellation and determine a current motion for the output pixel under consideration based on the information in the pixel constellation. A value for the output pixel may be determined based on the current motion and on a plurality of historical motion values determined for previous fields, where the historical motion may be quantized to reduce storage.

Figure 2A:
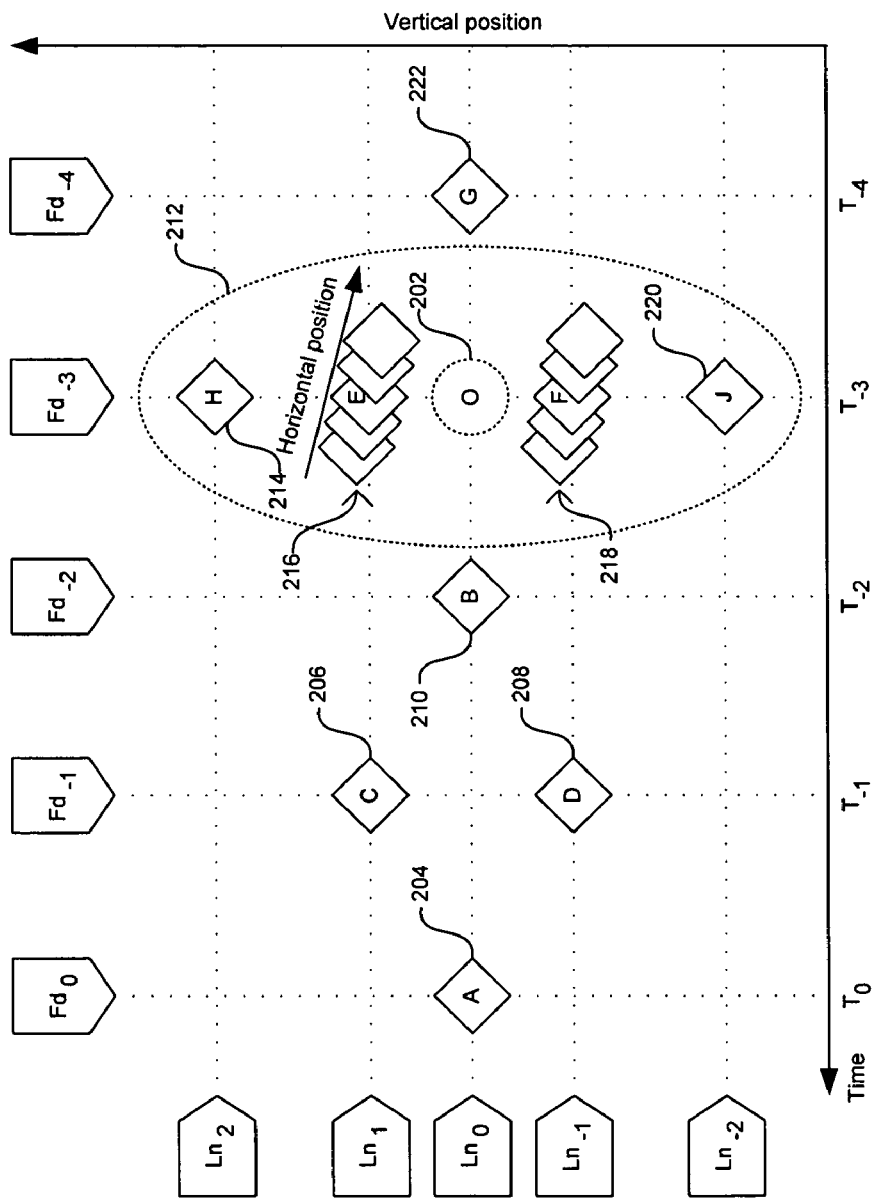
FIG. 2A illustrates an exemplary pixel constellation, in accordance with an embodiment of the present invention.

FIG. 2A illustrates an exemplary pixel constellation, in accordance with an embodiment of the present invention. Referring to FIG. 2A, the pixel constellation used by the MAD-3:2 102 to determine the motion-adapted value of the output pixel may comprise a plurality of pixels 212 in current field $Fd_{-3}$, a pixel (A) 204 in present line $Ln_0$ of field $Fd_0$, a pixel (C) 206 in present line $Ln_1$ of field $Fd_{-1}$, a pixel (D) 208 in present line $Ln_{-1}$ of field $Fd_{-1}$, a pixel (B) 210 in present line $Ln_0$ of field $Fd_{-2}$, and a pixel (G) 222 in present line $Ln_0$ of field $Fd_4$. The plurality of pixels 212 in current field $Fd_{-3}$ may comprise an output pixel (O) 202 in absent line $Ln_0$, a pixel (H) 214 in present line $Ln_2$, a plurality of pixels (E) 216 in present line $Ln_1$, a plurality of pixels (F) 218 in present line $Ln_{-1}$, and a pixel (J) 220 in present line $Ln_{-2}$.

Figure 2B:
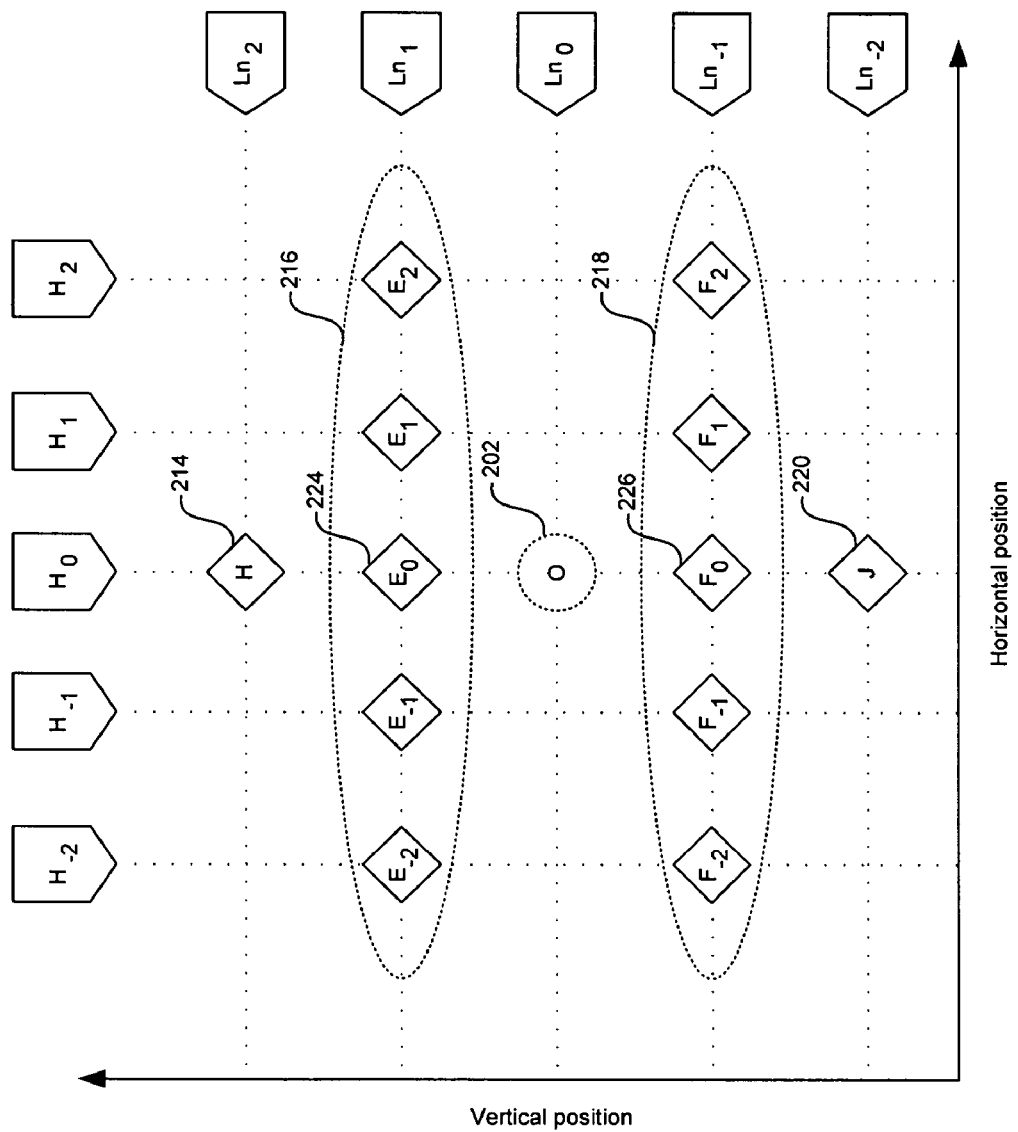
FIG. 2B illustrates exemplary positioning of constellation pixels in a current frame, in accordance with an embodiment of the invention.

FIG. 2B illustrates exemplary positioning of constellation pixels in a current frame, in accordance with an embodiment of the invention. Referring to FIG. 2B, the plurality of pixels E 216 in present line $Ln_1$ may comprise a pixel $E_0$ 224 immediately above the output pixel O 202, a pixel $E_{-1}$ and a pixel $E_{-2}$ to the left of the pixel $E_0$ 224, and a pixel $E_1$ and a pixel $E_2$ to the right of the pixel $E_0$ 224. Additional pixels to the right and left of pixel $E_0$ 624 may also be used. Moreover, additional pixels may be used with pixel (H) 214 in present line $Ln_2$. The plurality of pixels F 218 in present line $Ln_{-1}$ may comprise a pixel $F_0$ 226 immediately below the output pixel O 202, a pixel $F_{-1}$ and a pixel $F_{-2}$ to the left of the pixel $F_0$ 226, and a pixel $F_1$ and a pixel $F_2$ to the right of the pixel $F_0$ 226. Additional pixels to the right and left of pixel $F_0$ 626 may also be used. Moreover, additional pixels may be used with pixel (J) 620 in present line $Ln_{-2}$.

The pixel constellation shown in FIGS. 2A-2B may reduce the occurrence of motion aliasing by using information from additional fields. The pixel constellation may also improve spatial averaging by including additional horizontal pixels, for example, the plurality of pixels E 216 and the plurality of pixels F 218 in present lines $L_1$ and $L_{-1}$ of current field $Fd_{-3}$, when determining the value of output pixel O 202. With reference to FIGS. 2A-2B, time $T_0$ is shown on the left and fields to the right of $T_0$ are back in time from reference point $T_0$.

Figure 2C:
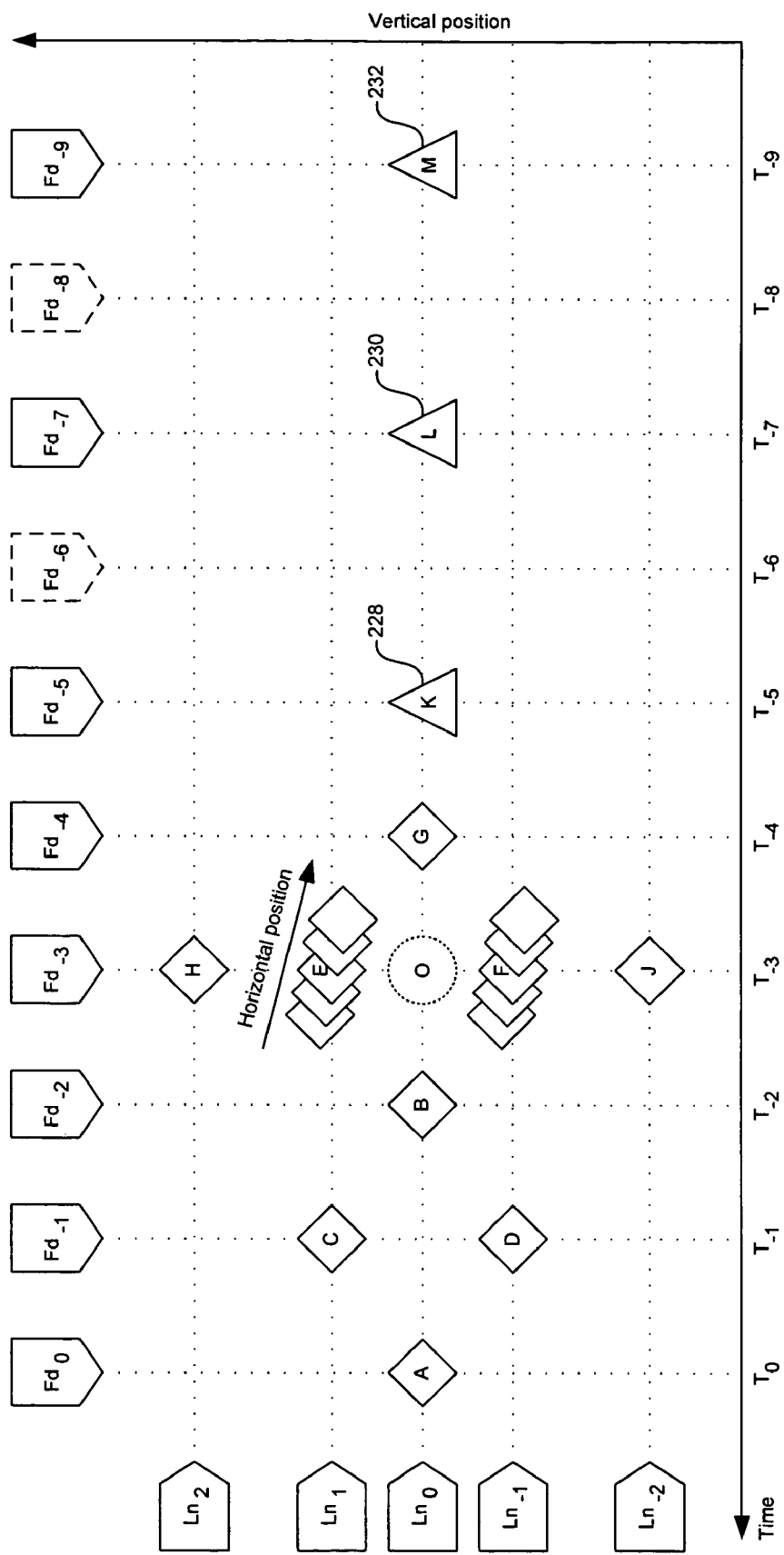
FIG. 2C illustrates an exemplary pixel constellation with locations for quantized historical motion values, in accordance with an embodiment of the present invention.

FIG. 2C illustrates an exemplary pixel constellation with locations for quantized historical motion values, in accordance with an embodiment of the present invention. Referring to FIG. 2C, locations K 228, L 230, and M 232 are not actual pixels, but instead, they represent the spatial and temporal locations of historical current motion values that may be used to determine the value of output pixel 0 202. These historical current motion values may have been quantized before storage. The gaps in historical motion information at $Fd_{-6}$ and $Fd_{-8}$ are due to the inclusion of historical motion information from fields of the same field type, whether top or bottom fields, as the current field. A coefficient Q may be used to correspond to a quantized version of the historical determination of current motion at that spatial/temporal location. The choice to use quantized motion allows for an increased range in time of fields, with minimal cost in gates or bandwidth. The benefit of this increased range in time fields being improved deinterlacing quality in the MAD-3:2 102 due to a reduced occurrence of motion aliasing.

Figure 3:
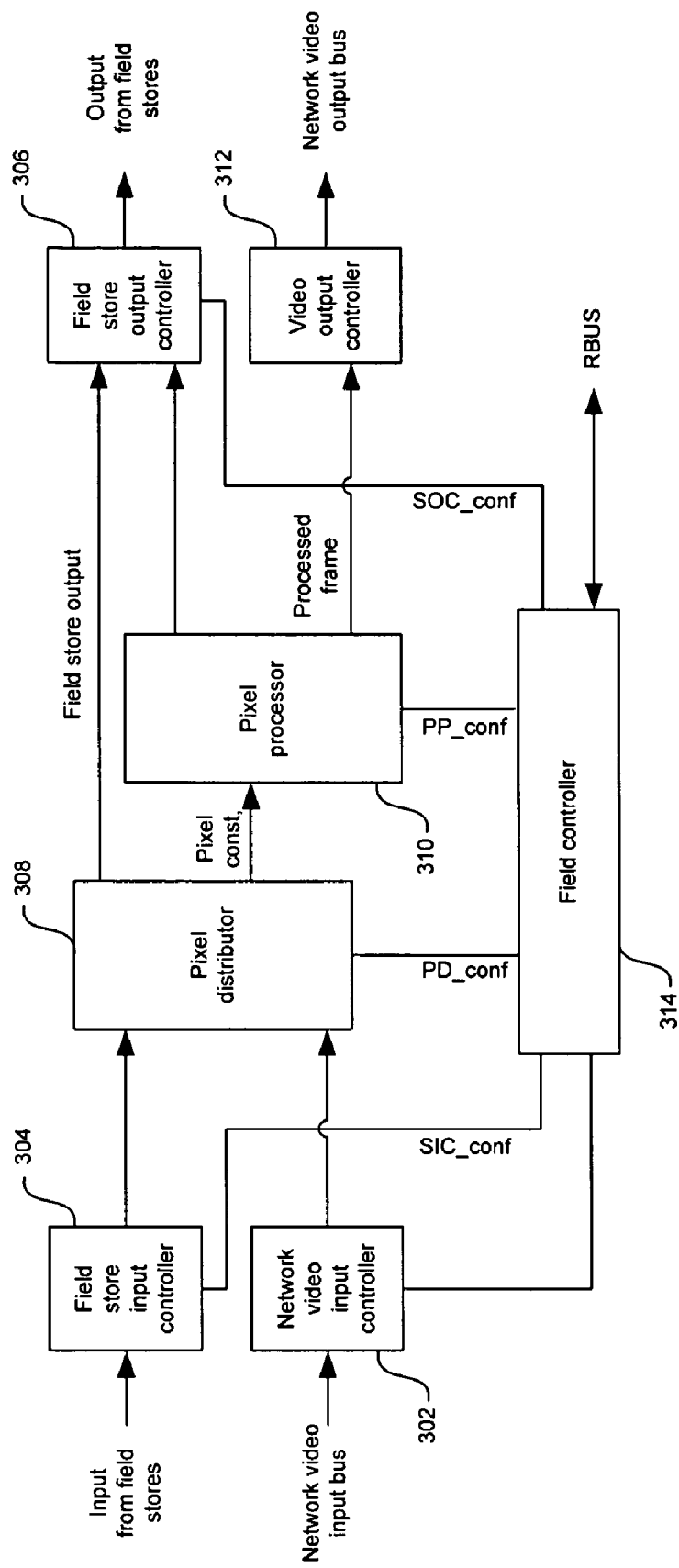
FIG. 3 illustrates a high level block diagram of a motion adaptive deinterlacer, in accordance with an embodiment of the invention.

FIG. 3 illustrates a high level block diagram of a motion adaptive deinterlacer, in accordance with an embodiment of the invention. Referring to FIG. 3, the MAD-3:2 102 in FIG. 1 may comprise a network video input controller 302, a field store input controller 304, a field store output controller 306, a pixel distributor 308, a pixel processor 310, a video output controller 312, and a field controller 314. The network video input controller 202 may comprise suitable logic, code, and/or circuitry that may be adapted to receive input from a network video input bus, to potentially scale up horizontally, and to provide a network feed A to the pixel distributor 308.

The field store input controller 304 may comprise suitable logic, code, and/or circuitry that may be adapted to manage fetching of pixel information and quantized historical motion information. The field store output controller 312 may comprise suitable logic, code, and/or circuitry that may be adapted to manage storage of pixel information and quantized historical motion information. The pixel distributor 308 may comprise suitable logic, code, and/or circuitry that may be adapted to accept pixel information and quantized historical motion information from the field store input controller 304 and from the network video input controller 302 and provide the constellation of pixels described in FIGS. 2A-2C to the pixel processor 310.

The pixel processor 310 may comprise suitable logic, code, and/or circuitry that may be adapted to convert from linear array of pixels to a raster or processed frame format. The video output controller 312 may comprise suitable logic, code, and/or circuitry that may be adapted to prepare the processed frame for transmission as a progressive or deinterlaced output over a network video output bus. The field controller 314 may comprise suitable logic, code, and/or circuitry that may be adapted to manage the transfer of pixel and quantized historical motion information and to modify and update registers used to manage the transfer of pixel and quantized historical motion information. The field controller 314 may transfer data and/or control information to the processor 104 and/or the memory 106 through the RBUS bus.

Figure 4:
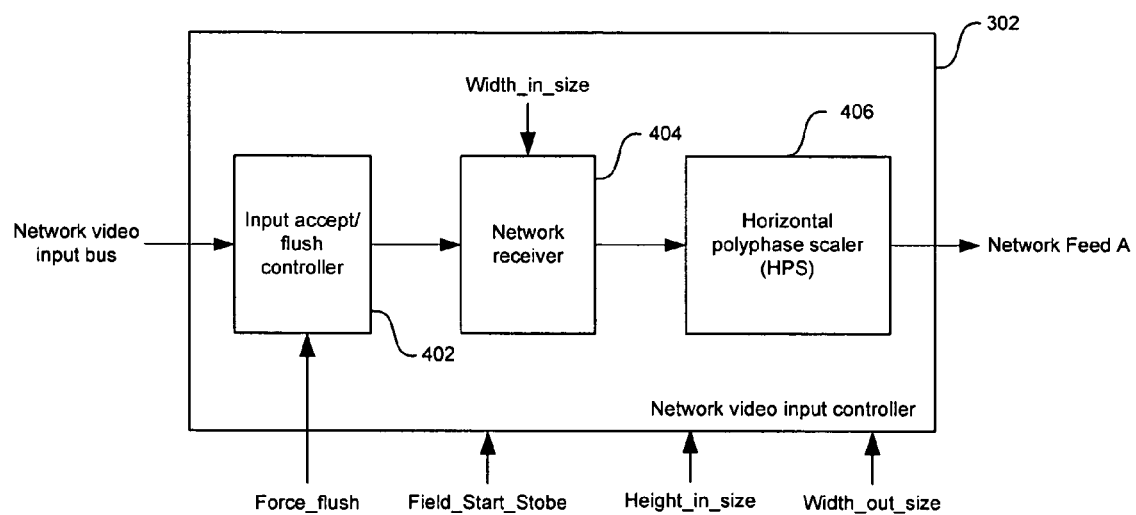
FIG. 4 is a block diagram of an exemplary network video input controller that may be utilized with a multi-field deinterlacer, in accordance with an embodiment of the invention.

FIG. 4 is a block diagram of an exemplary network video input controller that may be utilized with a multi-field deinterlacer, in accordance with an embodiment of the invention. Referring to FIG. 4, the network video input controller 302 may comprise an input accept/flush controller 402, a network receiver 404, and a horizontal polyphase scaler 406. The network video input controller 302 may provide line alignment of the pixels in the pixel constellation used by the MAD-3:2 102. This module may halt at the end of a field and wait for a Field_Start_Strobe parameter before accepting a new field. The Field_Start_Strobe may be utilized to indicate the start of a new field and that input FIFOs be flushed and pixel feeders to the pixel distributor 308 be triggered to make their read requests.

The input accept/flush controller 402 may comprise suitable logic, code, and/or circuitry that may be adapted to accept and/or flush information from the network video input bus based on the Field_Start_Strobe parameter and a Force_flush parameter respectively. The Force_flush parameter may be utilized to indicate that no input from the network input video bus is expected and that there may be a need to create black pixels in the output frame and/or that markers be set for the start/end of a line and/or the start/end of a field. The network receiver 404 may comprise suitable logic, code, and/or circuitry that may be adapted to halt at the end of a field and wait for parameter Field_Start_Strobe to proceed. The network receiver 404 may also be adapted to ensure that a field received is, for example, of a particular height, which may be defined utilizing a parameter Height_in_size and that the field conforms with, for example, a locally programmable expected line width which may be given by a parameter Width_in_size. The network receiver 404 may be adapted so that at the end of a field, the network receiver 404 may stop receiving inputs. The parameter Height_in_size may indicate the expected number of lines which may be received in a field. The network receiver 404 may be adapted to discard any additional lines received. If too few lines are received, the network receiver 404 may insert additional lines consisting of black pixels. The parameter Width_in_size may indicate an expected number of pixels per line at the input of the horizontal polyphase scaler 406. Additional pixels may be discarded by the network receiver 404. In instances when there are too few pixels, the shortfall may be compensated by the network receiver 404 by inserting black pixels until the required width has been attained.

The horizontal polyphase scaler (HPS) 406 may be utilized to either pass through 1:1 or upscale the input field. The ability to downscale may also be provided. In an embodiment of the invention, the horizontal polyphase scaler 406 may be 8 phase with 8 taps per phase and may include phase interpolation to give a total of 64 available phase positions. The coefficients of the horizontal polyphase scaler 406 may be programmable. The network feed A may comprise a plurality of signals, for example, the pixel information, the start of a line, the start of a field, the end of a line, and/or the end of a field. To minimize locking up the MAD-3:2 102, a parameter Width_out_size may be used to manage the expected number of pixels per line at the output of the horizontal polyphase scaler 406. Additional pixels from those expected by parameter Width_out_size may be discarded by the horizontal polyphase scaler 406. Too few pixels may be made up to the required width by inserting black pixels. When parameter Force_flush is set, there may be no expected input for the network video input controller 302 and the entire field size given by parameters Height_in_size and Width_out_size may of black pixels output from the horizontal polyphase scaler 406 as network feed A, including the necessary start and end line/field signals.

Figure 5:
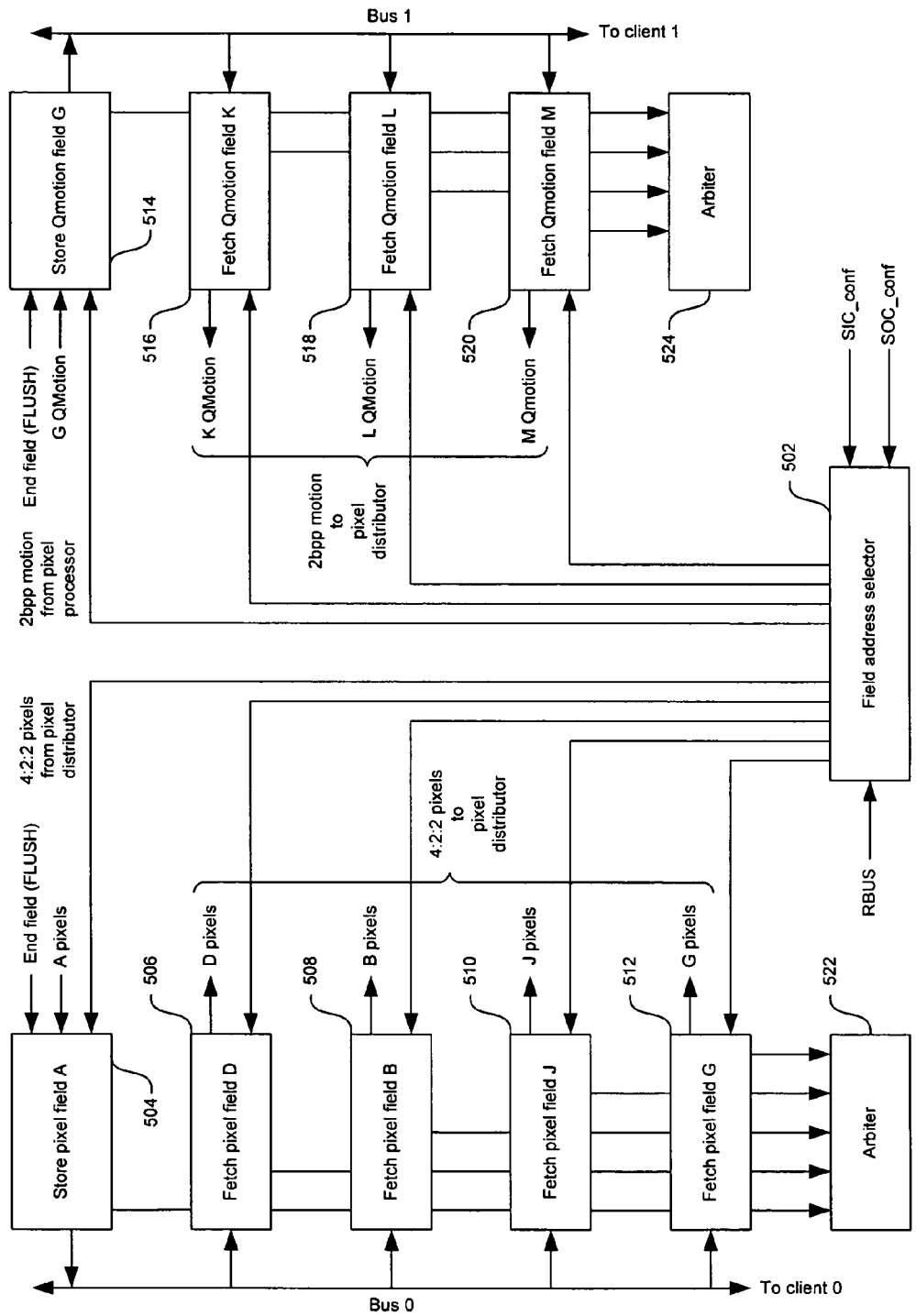
FIG. 5 is a block diagram illustrating an exemplary implementation of the field store input controller and the field store output controller that may be utilized with a multi-field deinterlacer, in accordance with an embodiment of the invention.

FIG. 5 is a block diagram illustrating an exemplary implementation of the field store input controller and the field store output controller that may be utilized with a multi-field deinterlacer, in accordance with an embodiment of the invention. Referring to FIG. 5, the field store input controller 304 and the field store output controller 306 may be implemented in the MAD-3:2 102 in FIG. 1 by using a configuration shown in FIG. 5. The configuration may comprise a field address selector 502, a store pixel field A 502, a fetch pixel field D 506, a fetch pixel field B 508, a fetch pixel field J 510, a fetch pixel field G 512, a store Qmotion field G 514, a fetch Qmotion field K 516, a fetch Qmotion field L, a fetch Qmotion field M, and arbiters 522, 524. The pixel fetch configuration may be adapted to manage a plurality of pixel fields stores, for example, the 5 pixel field stores (A, B, D, G, and J) by using the store pixel field A 502, the fetch pixel field D 506, the fetch pixel field B 508, the fetch pixel field J 510, the fetch pixel field G 512, and arbiter 522. The pixel fetch configuration may also be adapted to manage a plurality of Qmotion fields stores, for example, the 3 fields of quantized historical motion (K, L, and M) by using the store Qmotion field G 514, the fetch Qmotion field K 516, the fetch Qmotion field L, the fetch Qmotion field M, and arbiter 524. Each pixel field fetch/store and Qmotion fetch/store may be managed independently, in order to ensure that, for example, dataflow is not complicated between fields. There may be two buses for pixel and Qmotion fields fetch/store, namely a Bus 0 and a Bus 1. The Bus 0 may be coupled to a client 0 and the Bus 1 may be coupled to a client 1, where client 0 and client 1 may comprise suitable logic, code, and/or circuitry that may be adapted to store or retrieve pixel and Qmotion fields stores. The store pixel field A 504 and the store Qmotion field G 514 may receive an indication that a field has ended or that flushing may be taking place.

The field address selector 502 may comprise seven (7) programmable address pointers, where four (4) address pointers may be assigned for pixel fields fetch/store and three (3) address pointers may be assigned for quantized historical motion fields fetch/store. The number of pointers for the field address selector 502 may vary without departing from the various aspects of the invention. The number of address pointers and their assignments may be different without departing from the various aspects of the invention.

A signal SIC_conf is a configuration signal which may originate from the field controller 314 and which may be utilized for the operation of the field store input controller 304 in the exemplary implementation shown in FIG. 5. The SIC_conf signal may be utilized to select one pointer for each pixel field fetch (B, D, J, G) and may be used to select one pointer for each Qmotion field fetch (K, L, M). A signal SOC_conf is a configuration signal which may originate from the field controller 314 and which may be utilized for the operation of the field store output controller 306 in the exemplary implementation shown in FIG. 5. The SOC_conf signal may be utilized to select at least one pointer for the store pixel field A 504 and to select at least one pointer for the store Qmotion field G 514. The address selection may be made at the start of a field, and may not change within the field.

With regard to arbitration, the fetch/store pixel fields and the fetch/store Qmotion fields may send their requests to the arbiters 522, 524 respectively. The arbiters 522, 524 may allocate accesses to any single fetch or store request. If multiple requests arrive, the arbiters 522, 524 will service them in, for example, a round-robin scheme. The round robin arbitration scheme may guarantee that each desired access to the client 0 through the Bus 0 may be serviced within, for example, 5 service periods. The round robin arbitration may guarantee that each desired access to the client 1 through the Bus 1 may be serviced within, for example, 4 service periods.

One or more data structures may be managed by the implementation in FIG. 5. For example, a 4:2:2 pixel data structure and a 2 bpp Qmotion data structure may be utilized. In an embodiment of the invention, the data may be arranged as field fetch/store with the following requirements. For the 4:2:2 pixel field store, 4:2:2 data may be stored in 8 Jword bursts, using 6 bursts per line service period. A Jword burst may correspond to, for example, 256 bits or 32 bytes of 4:2:2 data. Support for different byte ordering may not be required, since this may be implemented as a private data structure— UYVY format is an acceptable format. Support for different endian ordering may not be required, since this may be implemented as a private data structure. However, endian and byte ordering for the fetch blocks may be required in order to match the store blocks for the MAD-3:2 102 in FIG. 1. Furthermore, no rasterization process may be required since the pixel fields information may be stored as a linear array of pixels per field, which may be different than the video feeder or video capture in that no start or end of line information is needed. No horizontal or vertical resampling may be required for the pixel sampling grid defined. Since the MAD-3:2 102 operates on fields, the fetching and storing operations do not need to have an awareness of whether the field is a top or bottom field. The invention may operate on any field size, for example, fields of sizes up to 720×576.

For 2 bpp QMotion data structure, there may be 2 bpp data packed 4 pixels/byte which may be stored in, for example, 6 Jword bursts, utilizing a 12 Jword burst buffer. Each burst may be adapted to transfer just over a line of data, for example, 720 pixels of 2 bpp motion. Support for different byte ordering may not be required since this is a private data structure. Additionally, support for different endian ordering may not be required, since this may be implemented as a private data structure. However, the endian and byte ordering for fetching may have to match that for storing. No rasterization process may be required since the Qmotion information may be stored as a linear array of 2 bpp in a field. This may be different from the video feeder or video capture in that no start or end of line information may be required. No horizontal or vertical resampling may be required. Since the MAD-3:2 102 operates on fields, the fetching and storing operations do not need to have an awareness of whether the field is a top or bottom field. However, the invention may not be so limited.

Figure 6A:
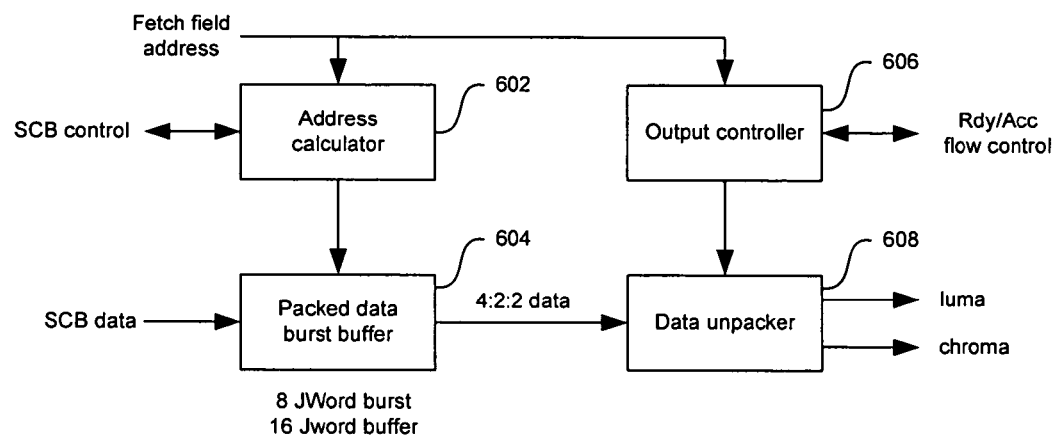
FIGS. 6A-6B illustrate exemplary block diagrams for fetch pixel fields and store pixel fields, in accordance with an embodiment of the invention.
Figure 6B:
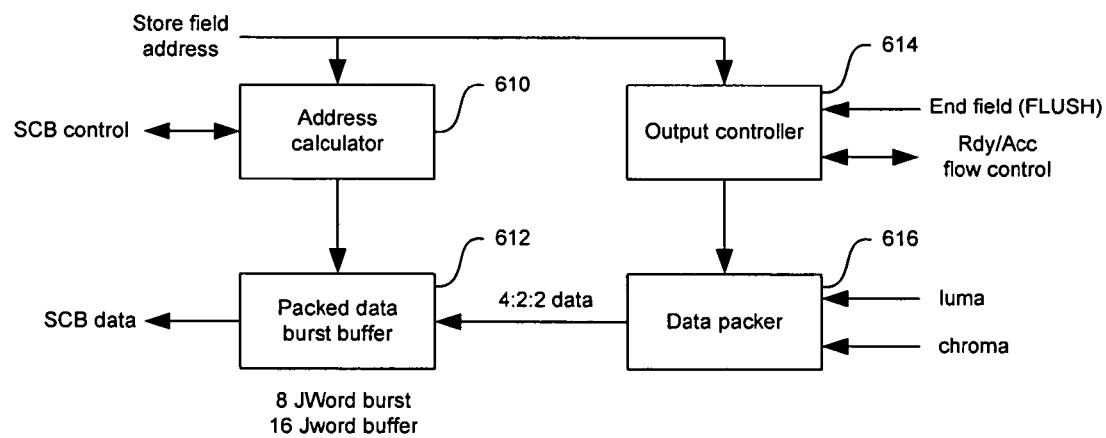

FIGS. 6A-6B illustrate exemplary block diagrams for fetch pixel fields and store pixel fields, in accordance with an embodiment of the invention. Referring to FIG. 6A, the fetch pixel fields in FIG. 5 may comprise an address calculator 602, a packed data burst buffer 604, an output controller 606, and a data unpacker 608. The address calculator 602 may comprise suitable logic, code, and/or circuitry that may be adapted to accept fetch field addresses and to transfer control information with client 0 through the Bus 0 in FIG. 5. The output controller 606 may comprise suitable logic, code, and/or circuitry that may be adapted to manage flow control signals. The packed data burst buffer 604 may comprise suitable logic, code, and/or circuitry that may be adapted to receive pixel information from the client 0 through the Bus 0 in FIG. 5. The data unpacker 608 may comprise suitable logic, code, and/or circuitry that may be adapted to convert 4:2:2 pixel information into luma and chroma pixel information.

The address calculator 602 may accept the fetch field address from the field address selector 502 at the start of a field. The address calculator 602 may start reading data by incrementing the address every burst until the end of the field. The address calculator 602 may stop reading from memory if the packed data burst buffer 604 is full, and will initiate a new read when, for example, the packed data burst buffer 604 is half. The address calculator 602 may assert flow control on the ready/accept interface of the output controller 606, and pause the output pixels when the packed data burst buffer 604 is empty. The packed data burst buffer 604 may operate continuously in a field, since there may be no requirements for 2-D line rasterization in this data structure. All lines may be fetched contiguously from memory as a single field. The data unpacker 608 may convert 4:2:2 pixel fields format to YCrCb pixel fields format.

Referring to FIG. 6B, the store pixel field A 504 may comprise an address calculator 610, a packed data burst buffer 612, an output controller 614, and a data packer 616. The address calculator 610 may comprise suitable logic, code, and/or circuitry that may be adapted to accept store field addresses and to transfer control information with client 0 through the Bus 0 in FIG. 5. The output controller 614 may comprise suitable logic, code, and/or circuitry that may be adapted to manage flow control signals and to receive a signal indicating the end of the field or that flushing may be taking place. The packed data burst buffer 612 may comprise suitable logic, code, and/or circuitry that may be adapted to send pixel information to client 0 through Bus 0 in FIG. 5. The data unpacker 616 may comprise suitable logic, code, and/or circuitry that may be adapted to convert luma and chroma pixel information into 4:2:2 pixel information.

The address calculator 610 may accept the store field address from the field address selector 502. The address calculator 610 may initiate a write burst when the packed data burst buffer 612 is half full. The address calculator 610 will continue to write data to memory, and increment the address with each burst until a signal indicating the end of the field or that flushing may be taking place is received. At the end of a field, the address calculator 610 may generate a partial write burst when the last pixel is received. The address calculator 610 will assert flow control on the ready/accept interface in the output controller 614 and may pause when the packed data burst buffer 612 is full. The packed data burst buffer 612 may operate continuously in a field, since there may be no requirements for 2-D line rasterization in this data structure. All lines may be stored contiguously in memory as a single field. The packed data burst buffer 612 may require a signal which indicates that the last pixel in the field has arrived. In this regard, a signal indicating the end of a field may inform the packed data burst buffer 612 to write any intermediate results to memory in a partial burst. Byte write enables may be required to ensure that the packed data burst buffer 612 does not write beyond it's required data structure in memory. The data packer 616 may convert YCrCb pixel field format to 4:2:2 pixel fields format.

Figure 6C:
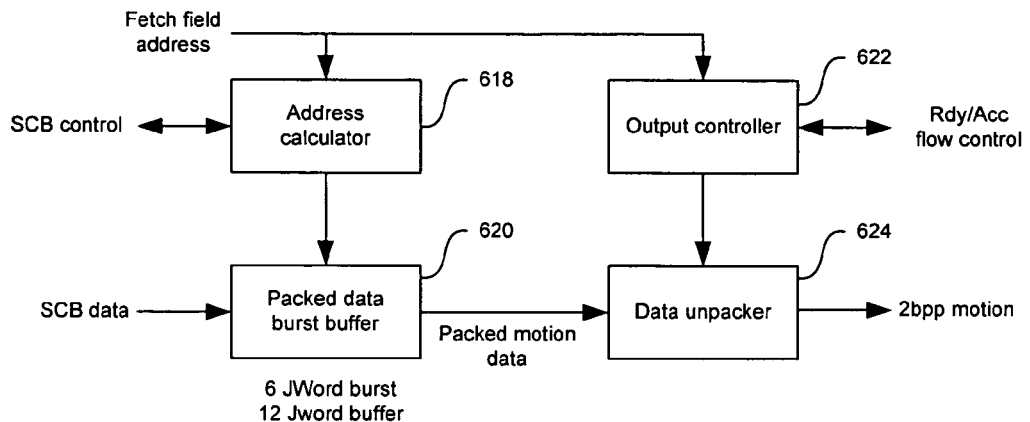
FIGS. 6C-6D illustrate exemplary block diagrams for fetch Qmotion fields and store Qmotion fields, in accordance with an embodiment of the invention.
Figure 6D:
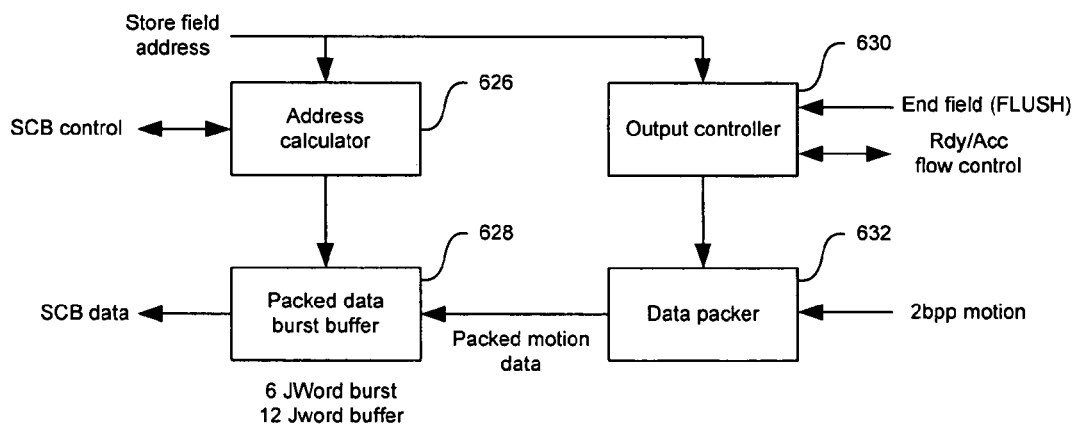

FIGS. 6C-6D illustrate exemplary block diagrams for fetch Qmotion fields and store Qmotion fields, in accordance with an embodiment of the invention. Referring to FIG. 6C, the fetch Qmotion fields in FIG. 5 may comprise an address calculator 618, a packed data burst buffer 620, an output controller 622, and a data unpacker 624. The address calculator 618 may comprise suitable logic, code, and/or circuitry that may be adapted to accept fetch field addresses and to transfer control information with client 1 through the Bus 1 in FIG. 5. The output controller 622 may comprise suitable logic, code, and/or circuitry that may be adapted to manage flow control signals. The packed data burst buffer 620 may comprise suitable logic, code, and/or circuitry that may be adapted to receive Qmotion information from client 1 through the Bus 1 in FIG. 5. The data unpacker 624 may comprise suitable logic, code, and/or circuitry that may be adapted to convert packed Qmotion information into 2 bpp motion information.

Referring to FIG. 6D, the store Qmotion field G 514 in FIG. 5 may comprise an address calculator 626, a packed data burst buffer 628, an output controller 630, and a data packer 632. The address calculator 626 may comprise suitable logic, code, and/or circuitry that may be adapted to accept store field addresses and to transfer control information with client 1 through the Bus 1 in FIG. 5. The output controller 630 may comprise suitable logic, code, and/or circuitry that may be adapted to manage flow control signals and to receive a signal indicating the end of the field or that flushing may be taking place. The packed data burst buffer 628 may comprise suitable logic, code, and/or circuitry that may be adapted to send Qmotion information to client 1 through the Bus 1 in FIG. 5. The data packer 632 may comprise suitable logic, code, and/or circuitry that may be adapted to convert 2 bpp motion information into packed Qmotion information. The operation of the fetch Qmotion fields and the store Qmotion fields may be similar to the operation of the fetch pixel fields and the store pixel fields described in FIGS. 6A-6B respectively.

Figure 7:
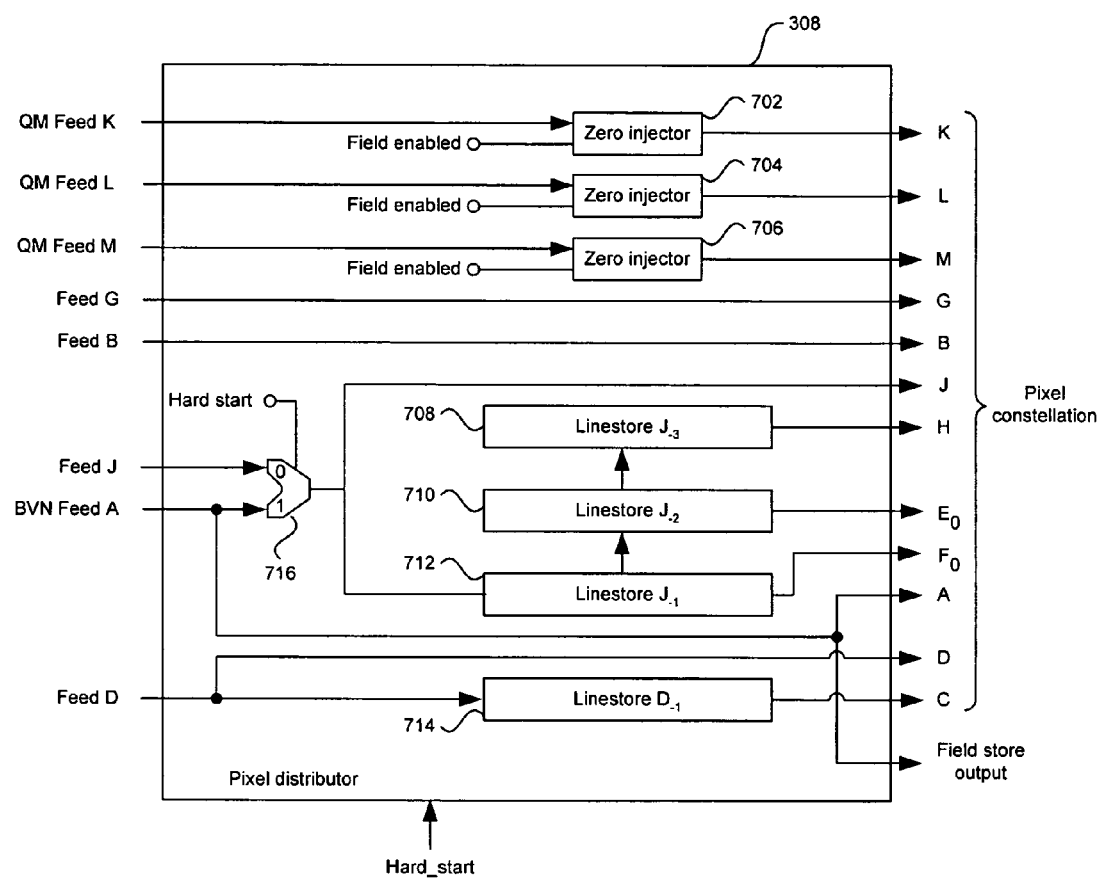
FIG. 7 is a block diagram of an exemplary pixel distributor that may be utilized with a multi-field deinterlacer, in accordance with an embodiment of the invention.

FIG. 7 is a block diagram of an exemplary pixel distributor that may be utilized with a multi-field deinterlacer, in accordance with an embodiment of the invention. Referring to FIG. 7, the pixel distributor 308 may comprise zero injectors 702, 704, and 706, a linestore $J_{-3}$ 708, a linestore $J_{-2}$ 710, a linestore $J_{-1}$ 712, a linestore $D_{-1}$ 714, and a selector 716. The zero injectors 702, 704, and 706 may comprise suitable logic, code, and/or circuitry that may be adapted to provide a zero value when the quantized historical motions are disabled. The linestore $J_{-3}$ 708, the linestore $J_{-2}$ 710, the linestore $J_{-1}$ 712, and the linestore $D_{-1}$ 714 may comprise suitable logic, code, and/or circuitry that may be adapted to store pixel information for constructing the pixel constellation. The selector 716 may comprise suitable logic, code, and/or circuitry that may be adapted to select the network feed A to take the place of the Feed J when a hard start startup procedure is indicated by a parameter HARD_START_SEL. The pixel distributor 308 may accept pixel information and quantized historical motion information from the field store input controller 304 and from the network video input controller 302 and provide the constellation of pixels described in FIGS. 2A-2C to the pixel processor 310. FIG. 7 illustrates how the pixel constellation is produced from feeders coming from the field store input controller 304 and from the network video input controller 302 and from the linestore $J_{-3}$ 708, the linestore $J_{-2}$ 710, the linestore $J_{-1}$ 712, and the linestore $D_{-1}$ 714. The pixel distributor 308 manages the line by line control of the feeder inputs and maintains the linestores so as to always provide the correct pixel constellation to the downstream processing.

The inputs from the feeders are directed both to the pixel constellation and, when required, to the linestores for reuse in subsequent vertical lines. A ready/accept protocol may be utilized to ensure that pixels in the constellation correspond to the same horizontal position in the source images in each valid clock. This may allow flow control of pixel throughput to be governed by the input rate of the network video input bus, the network video output bus, or a blocking mechanism. The output of the pixel distributor 308 may be adapted to a maximum throughput of about one pixel constellation per clock. The 4:2:2 chroma may be output in parallel alternating Cr and Cb. In certain instances, a reduced maximum may be permitted especially if it will give significant area savings. While the linestores may have been diagrammed individually in FIG. 7, a minimal number of physical memory may be utilized and addressing may be utilized to provide FIFO functionality. The choice of number/type of ports may be implementation dependent. It may be assumed that the new pixel value from the feeder may replace the old value in the linestore once that old value has been retrieved. Physical memory locations that are currently the linestore $J_{-3}$ 708 may be overwritten to become the linestore $J_{-1}$ 712, for example. Quantized motion fields K, L and M may be disabled individually. The pixel distributor 308 may inject a zero into the pixel constellation by using the zero injectors 702, 704, and 706, for any of the quantized motion fields that may have been disabled. This will ensure that no special computation is required in the pixel processing data path.

Several initial conditions may be required at the start of each field. The linestores may be loaded with the correct data at the start of a field before any attempt is made to pass pixel constellations out of this block for processing. This will take some time to complete but may occur during vertical blanking. The initial conditions may depend on whether the output frame is top or bottom field originated. For top field originated, the first line of source field at $T_{-3}$ in FIG. 2A may be in the linestore $J_{-2}$ 710 and the second line of source field at $T_{-3}$ in FIG. 2A may be in the linestore $J_{-1}$ 712. The first line of source field at $T_{-1}$ in FIG. 2A may be in the linestore $D_{-1}$ 714. For bottom field originated, the first line of source field at $T_{-3}$ in FIG. 2A may be in the linestore $J_{-1}$ 712.

Providing lines of pixels that lie outside the source images may require a multiplexer (MUX) in the datapath for Feed D and Feed J and the output of the linestore $J_{-3}$ 708, the linestore $J_{-2}$ 710, the linestore $J_{-1}$ 712, and the linestore $D_{-1}$ 714. At the current vertical position, any linestore or feeder that would have been expected to have provided a line that is outside the image, may be MUXed into the pixel constellation the pixels from the closest line that is in the image. At the top of the image, the substitute line(s) may be replicated from below. At the bottom of the image the substitute line(s) may be replicated from above.

For Feed J and Feed D, a line of data may be read from these feeders one or two lines before data is accepted from any of the other feeders. For a given field, data may also cease one or two lines before data is accepted from the other feeders.

Notwithstanding, the pipeline may continue to pass data through, in order to correctly end the frame.

Figure 8:
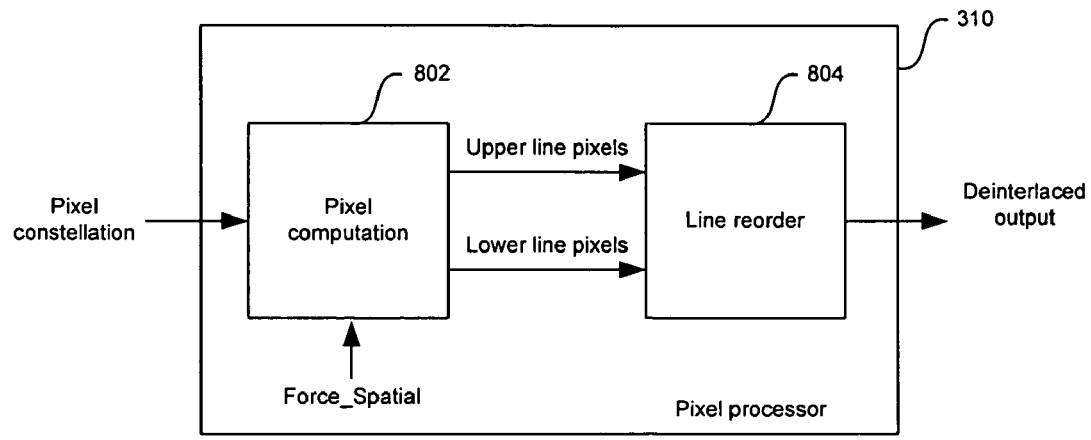
FIG. 8 is a block diagram of an exemplary pixel processor that may be utilized with a multi-field deinterlacer, in accordance with an embodiment of the invention.

FIG. 8 is a block diagram of an exemplary pixel processor that may be utilized with a multi-field deinterlacer, in accordance with an embodiment of the invention. Referring to FIG. 8, the pixel processor 310 may comprise a pixel computation 802 and a line reorder 804. The pixel computation 802 may comprise suitable logic, code, and/or circuitry that may be adapted to produce two lines of output pixels from the information in the pixel constellation, upper level control signals, and calculations it performs. The line reorder 804 may comprise suitable logic, code, and/or circuitry that may be adapted to take two vertically adjacent pixels at 480 interlaced (480$i$) rate from the pixel computation 802 and buffer them so that two lines may be output sequentially at 480 progressive (480$p$) rate. The line reorder 840 may not be limited to 480$i$ to 480$p$ rate conversion but may be programmable and may accept a plurality of rate conversions.

A Force_Spatial parameter may be utilized to indicate to the pixel computation 802 that a deinterlaced luma value for the output pixel may be passed through a compass filter. The parameter Force_Spatial may also indicate that a cross-chroma removal at the pixel computation 802 may be disabled.

Figure 9:
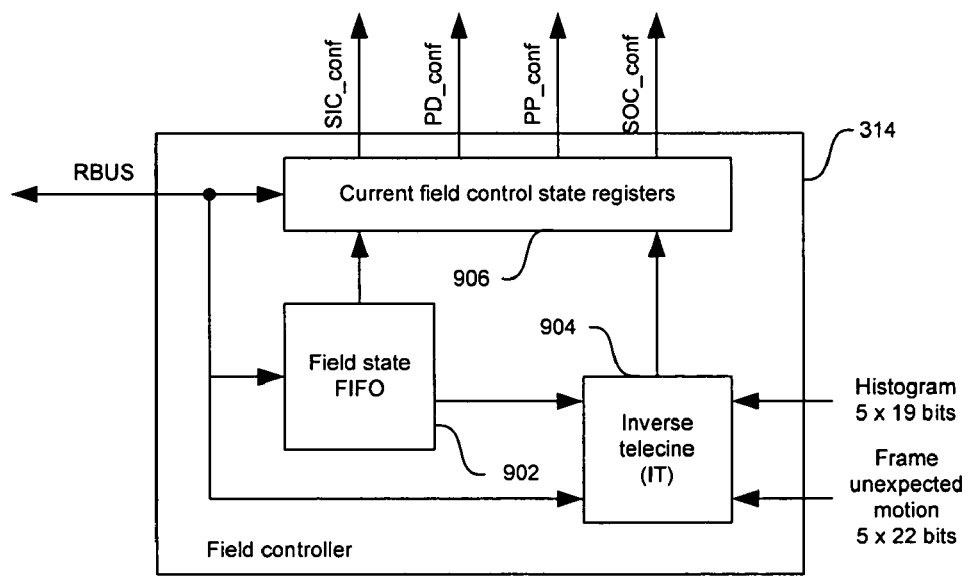
FIG. 9 is a block diagram of an exemplary field controller that may be utilized with a multi-field deinterlacer, in accordance with an embodiment of the invention.

FIG. 9 is a block diagram of an exemplary field controller that may be utilized with a multi-field deinterlacer, in accordance with an embodiment of the invention. Referring to FIG. 9, the field controller 314 may comprise a field state FIFO 902, an inverse telecine (IT) 904, and a current field control state registers 906. The field state FIFO 902 may comprise suitable logic, code, and/or circuitry that may be adapted to handle the interface between software and hardware control of the MAD-3:2 102 in FIG. 1. The inverse telecine 904 may comprise suitable logic, code, and/or circuitry that may be adapted to facilitate detection of a 3:2 or potentially 2:2 pulldown and then provide the correct control to the pixel processing block to allow reverse 3:2 or 2:2 to take place. The current field control state registers 906 may comprise suitable logic, code, and/or circuitry that may be adapted to contain registers for modifying and/or updating the operation of the network video input controller 302, the field store input controller 304, the pixel distributor 308, the field store output controller 306, and the pixel processor 310.

The field state FIFO 902 may be adapted to provide a simplified interface between the deinterlacer and the processor 104 in FIG. 1. The field state FIFO 902 may be adapted to take care of remembering the state of all the field stores and start and stop transitions so that a system software may give a single command for each field without having to keep any records of what happened in previous fields. The field state FIFO 902 maintains automatic control of field stores and ensures that the correct field store is read or written by a given feeder at the right time. By utilizing a force spatial operating mode, for example, the field state FIFO 902 may be adapted to handle the timing associated with enabling and disabling the temporal approximation options for deinterlacing. The force spatial operation mode may be adapted to automatically prevent unwanted visual artifacts from occurring during field type discrepancies and startup and shutdown procedures. The use of the force spatial operation mode may be indicated by the parameter Force_Spatial.

The field state FIFO 902 may also be adapted to provide, for example, a software selectable hard start operating mode. The software selectable hard start mode may be adapted to control a pixel distribution block and feeders to allow the first field to be repeated a plurality of times, for example, four times. This provides a much cleaner output for the display during the transition time required for startup of the deinterlacer. If this was not provided in hardware, the procedures controlling the multiple fields in the deinterlacer may be much more complex to implement in software. The hard start mode may also be adapted to maintain a constant color during the transition period. If the multi-field control operation were not handled in hardware, then holding a constant color during the transition period using software would be a more complex operation. The value used for the constant color may be generated or may be retrieved from memory. The use of the hard start mode may be indicated by the parameter Hard_Start.

When the hard start mode is selected, the network feed A may be routed into the linestore $J_{-1}$ 712 in FIG. 7 as well as to the memory 106 in FIG. 1 so that the first input field may be held constant on the display during this startup mode. In subsequent fields, during the startup procedure, the field controller 314 may ensure that the correct field store is read repeatedly by feeder J. This block may not have to concern itself with the fact that the startup procedure is ongoing.

The field state FIFO 902 may also be adapted to provide a software selectable flush mode. The software selectable flush mode may be configured to control the network video input controller 302 and feeders to allow pictures currently held in the field stores to be output to the display without having to supply new fields on the network video input. This provides a much cleaner output for display during the transition periods such as during shut down of the deinterlacer or during switching to a new signal source. The use of the flush mode may be indicated by the parameter Force_flush.

The inverse telecine 904 may be adapted to have two control paths. The hardware may detect and provide the correct signals for reverse 3:2 pulldown. Alternatively, the processor 104 of FIG. 1 may be used to implement more complex 3:2 detection or potentially be used to provide 2:2 detection. The processor 104 may then be responsible for programming the registers in the current field control state registers such that the required weave may be performed by the pixel processor 310. The pipelining of inputs and outputs to the inverse telecine 904 may ensure that the processor 104 has almost an entire field time in which to perform its tasks.

The current field control state registers 906 may be set at the beginning of a field, for example, just before the feeders are given their triggers to start reading data. The current field control state registers 906 may be held constant for the entire field. The transitions of the outputs of the field state FIFO 902 and/or the inverse telecine 904 to the current field control state registers 906 may be disabled so that those state registers may be programmed via, for example, the RBUS. In cases where the state comes from the field state FIFO 902, there may be two paths for setting the state registers. Either they may be programmed directly and then the deinterlacer may be activated for a new field, or the processor 104 may set registers in the field state FIFO 902 and enable the deinterlacer. Once the new state is determined, it may be loaded into the current field control state registers 906 and the feeders may be activated. The current field control state registers 906 involved in inverse telecine may either be updated directly over RBUS or the inverse telecine 904 may prepare the next new state. This new state may also be transferred just before the feeders are given their triggers to start.

The outputs of the current field control state registers 906 may be adapted to configure the modes the MAD-3:2 102 and the start trigger may be adapted to set up the feeders and hence the deinterlacing process at the start of each field. The field controller 314 may also provide an interrupt signal to the processor 104. This interrupt may serve as an indication that statistics from the field are complete and are ready to be read.

Figure 10:
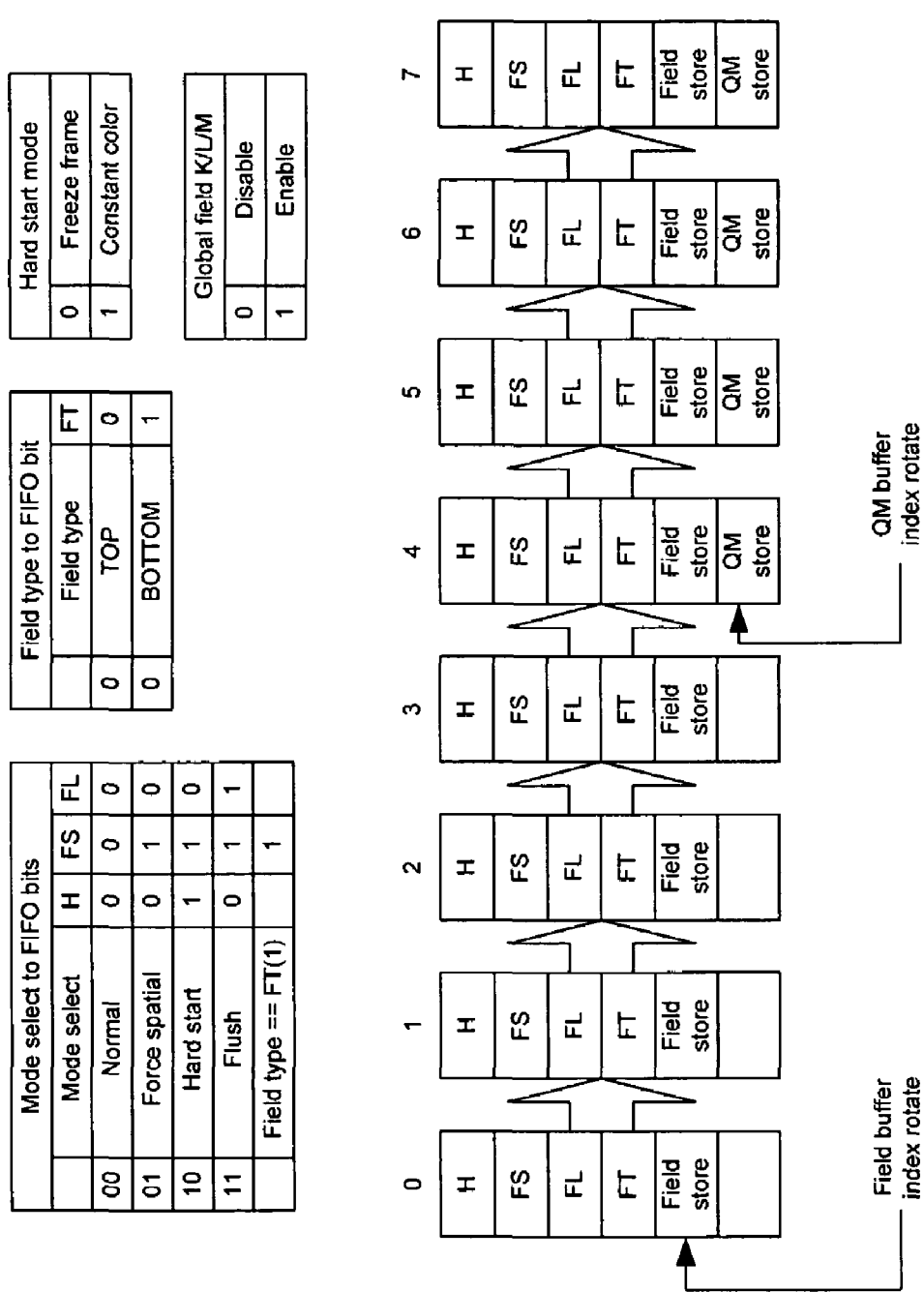
FIG. 10 illustrates a field state FIFO that may be utilized in connection with a multi-field deinterlacer, in accordance with an embodiment of the invention.

FIG. 10 illustrates a field state FIFO that may be utilized in connection with a multi-field deinterlacer, in accordance with an embodiment of the invention. Referring to FIG. 10, each FIFO entry in the field state FIFO 902 may comprise several bits that determine the state for pixel and quantized historical motion fields at instances $t_0$ on the left, through $t_9$ on the right. These instances directly correspond to the feeds A, D, B, J, G, K, L and M, respectively. Not all field state FIFO 902 entries may be illustrated in FIG. 10. Notwithstanding, the processor 104 in FIG. 1 may program the hard start mode and the field enables for K, L, and M infrequently. On every field, the processor 104 may program the mode select and the field type, and outside the field controller 314, the horizontal polyphase scaler 406 in FIG. 4, and then it may enable the deinterlacer. The new field type may be examined and compared against the previous field type, FT(1), or FT(0) if the FIFO has not yet been shifted. A switch may occur if the last field type was TOP then this field type should be BOTTOM. If the expected pattern is not met, an FS bit may be asserted in the field state FIFO 902 so that the deinterlacer may be forced into spatial only mode until the discrepancy has worked its way through the field stores.

The FIFO stage 0 may correspond to a current field that will be coming from the network video input bus. The field state FIFO 902 may be updated and the new state passed on to the current field control state registers 906 before any feeder is allowed to start fetching from memory. If this is not the case, the feeder may not know which field store to fetch from. Since two sets of quantized motion stores may be maintained, one for each field type, the field state FIFO 902 elements related to quantized motion (QM Store and FS) may need to be duplicated. In this regard, each set may be used alternately. The field state FIFO 902 may advance once per input field upon a command from the processor 104 of FIG. 1. A debug mode may be provided, which without processor 104 intervention, advances at the bottom of every field after all writes to memory are complete. The field type may automatically toggle TOP/BOTTOM in this debug mode.

One embodiment of the invention provides an exemplary programming model for a multi-field deinterlacer. Unlike most other network video components, the MAD-3:2 102 in FIG. 1 may require that a significant amount of state data be maintained across many fields. This may result in extremely complex requirements for software control and software partitioning. For this reason, the invention provides two means of control that may require minimal increase in hardware. For maximum flexibility and debug, the processor 104 in FIG. 1 may take care of the state and directly control the data-path. For general use, a simplified interface for the processor 104 control may be additionally provided that specifies requirements only for the next new field. The MAD-3:2 102 may be adapted to maintain multiple fields of previous requirements and combine some or all available states into a set of controls to the data-path. The MAD-3:2 102 may also provide a more visually pleasing method for performing startup and shutdown of the deinterlacer.

Figure 11:
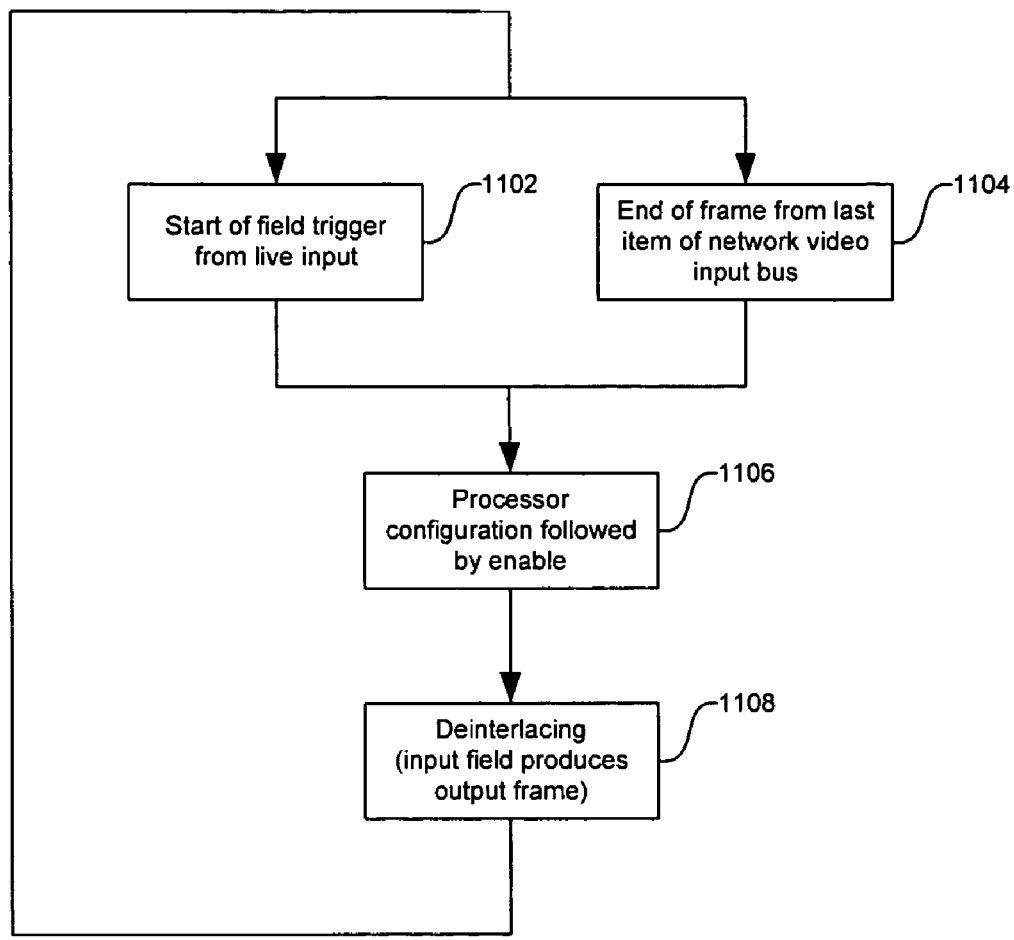
FIG. 11 illustrates an exemplary sequence of programming steps that may be utilized in connection with multi-field deinterlacing, in accordance with an embodiment of the invention.

FIG. 11 illustrates an exemplary sequence of programming steps that may be utilized in connection with multi-field deinterlacing, in accordance with an embodiment of the invention. Referring to FIG. 11, when the video source is coming from a live input, as shown in step 1102, then the input may provide an appropriate top or bottom field trigger signal. When the source is a feeder, as in step 1104, then whichever component is at the end of the network video input bus, whether capture or compositor, will provide the top or bottom field trigger signal. In step 1106, configuration of the processor may follow the enabling signal provided by either step 1102 or step 1104. When the input field ends, step 1108 may be stopped and hence the output frame may also end.

With regard to the initial register programming that may be utilized in this programming model, since the MAD-3:2 102 stops processing at the end of every output field, as shown in step 1108 in FIG. 11, the registers may be modified before the start of a new input field. Some MAD-3:2 102 operations are not expected to change frequently and registers that correspond to those operations may therefore be set once during initialization. One or more registers may be initialized on a field-by-field basis, these registers may be initialized by selecting from a plurality of modes. These registers may include, but are not limited to, a MODE_SEL register and an input field type register. The MODE_SEL register may be utilized to indicate the mode of operation of the MAD-3:2 102. The input field type register may be utilized to indicate whether a field is a top field or a bottom field. Once these registers have been modified, the MAD-3:2 102 may be enabled.

The MODE_SEL register modes may include, but are not limited to, a hard start mode, a normal mode, a force spatial mode and a flush mode. The hard start mode may be used in instances when, for example, the output of the MAD-3:2 is first connected to a display. Since a given field input to the deinterlacer will be output as a frame three field times later, a means is provided to cleanly handle the shift in time reference point when the previous driver of the display in question was not using the MAD-3:2. This is the task of the hard start mode. As selected with the parameter Hard_Start, two behaviors may be possible. Either the initial field may be displayed as a constant frame during the startup procedure or a constant color may be displayed instead. The hard start mode of MODE_SEL may only be specified for the very first input field to the MAD-3:2 102. From that point on, the MODE_SEL normal mode may be used.

Other than a cold startup, as described above, a hard start mode may be required under the following situations. These may include, but are not limited to, reprogramming of the pixel field store start addresses, reprogramming of the quantized motion field store start addresses, modifying the output frame width, modifying the input and hence output field and/or frame height. It may not be necessary to perform a hard start mode in instances where the input source of the deinterlacer changes.

The normal mode of MOD_SEL is the mode selected along with the necessary indication of top or bottom field at the network video input. The system software may not be required to maintain a history of previous top or bottom field indications. The system software may be adapted to specify what will be the new field type. The processor 104 of FIG. 1 may be configured to ensure that a correct pattern of top and bottom fields are received. When the field state FIFO 902 detects a discrepancy in the top and bottom field order, it will force the MAD-3:2 into the force spatial mode, where interpolation may be done for several fields until the discrepancies are no longer a factor. This mitigates unwanted visual artifacts that may otherwise occur due to unreliable data present in the field stores.

For example, the field state FIFO 902 may enable the data received from the quantized motion feeders to reach the pixel computation 802 using the zero injectors 702, 704, 706 in the pixel distributor 308 when a discrepancy in the TOP/BOTTOM pattern is detected or after the hard start mode is selected. When a discrepancy is detected or the hard start mode is selected, the force spatial mode may be enabled while the pixels of the pixel constellation are being filled. Once the pixel constellation is fully available, the force spatial mode may be disabled to allow temporal deinterlacing or reverse 3:2/2:2 deinterlacing. After filling the pixel constellation the discrepancy has not yet worked its way through the quantized motion fields, which may result in unreliable measurements of the current motion and the appearance of visible artifacts. Even when the discrepancy has cleared the five fields of pixels used for determining the present motion, the quantized historical motion values may still be unreliable. As subsequent fields pass and the discrepancy moves its way backwards through time relative to the pixel constellation, the quantized historical motion values may be enabled as they become reliable, with the last quantized historical motion value being enabled when the discontinuity or discrepancy has effectively dropped off the end of the ten fields that comprise the pixel constellation. In another embodiment, all the quantized motion values may be enabled when the discrepancy has cleared past the pixel constellation.

For the force spatial mode, the system software may indicate to the MAD-3:2 102 that only spatial interpolation be performed. This may be achieved by setting the MODE_SEL to the parameter Force_Spatial as well as changing the value of the input field type register to correspond to the new field type. Certain situations may warrant the use of the force spatial mode rather than the normal mode. These may include, instances where the video is very jittery, such as from a VCR. Many VCRs provide poor quality video on a line by line and field by field basis from a stable clock reference perspective. This may introduce unwanted artifacts when run through the deinterlacer because measures of motion become unreliable. In these instances, it may be preferable to force the deinterlacer to circumvent the requirement for a measure of motion and use a spatial approximation. Another instance may be when there is uncertainty whether the field type being supplied to the deinterlacer is a top field or a bottom field. The MAD-3:2 102 may have to be notified of the field type on a field-by-field basis, if the field type specified is repeatedly incorrect, then visual artifacts may result. It may take some time to determine the field type of a new source. If the processor 104 triggered the new source or notices a discrepancy, it might choose to initiate a force spatial mode for several fields until things have stabilized and are in a known stable state.

Since the output of the MAD-3:2 102 may occur three fields after the input, if the input is shut off for some reason, three pictures may be left in the pixel field stores which have not yet been displayed. It may be acceptable to simply ignore these pictures and move on. Notwithstanding, the flush mode may extract at least a portion of the output frames that correspond to input fields in the MAD-3:2 102 when the flush mode is enabled. This may be utilized during, for example, debugging.

When the flush mode is specified, no input is expected at the network video input of the MAD-3:2 102 but an output frame may be produced. Since the MAD-3:2 102 will not have the full complement of fields available for it to construct a pixel constellation and estimate motion, it may resort to a spatial interpolation when producing the output frame. In one aspect of the invention, in instances where all three fields are required, the flush mode may be specified three times in a row.

In most situations, with the notable exceptions of debug and more advanced algorithm development, it may be preferable to have a simplified system software interface and allow the MAD-3:2 102 to handle the complexities associated with multi-field de-interlacing. In accordance with various embodiments of the invention, the method and system for controlling a multi-field deinterlacer may comprise a field control block that may allow both a full control of field state in software or a much simplified software interface with control state being maintained by hardware. The full control of the field may be more complex than implementing a software interface with hardware maintained control state.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
    determining if a sufficient number of fields of a video signal have been received to generate a pixel constellation for motion adaptive deinterlacing; and
    if an insufficient number of fields have been received to generate a pixel constellation for motion adaptive deinterlacing, repeating display of a particular frame until said sufficient number of fields are available to generate said pixel constellation for motion adaptive deinterlacing, wherein said particular frame is selected from a constant color frame and a frame generated from an initial field of said video signal.

2. The method according to claim 1, wherein every pixel in said constant color frame has the same value.

3. The method according to claim 1, further comprising generating said particular frame via spatial interpolation of said initial field of said video signal.

4. The method according to claim 1, further comprising retrieving a pixel value for said constant color frame from a memory.

5. A method for video signal processing, the method comprising:
    receiving a first field from a video source;
    generating a deinterlaced frame from said received first field; and displaying said generated deinterlaced frame until a sufficient number of fields have been received and stored to generate a pixel constellation for motion adaptive deinterlacing.

6. The method according to claim 5, wherein said first field is a field for which there is a discrepancy between a provided field type and an expected field type, regardless of whether sufficient fields have been received and stored to generate said pixel constellation for motion adaptive deinterlacing.

7. The method according to claim 5, further comprising:
detecting jitter in video signals received from a video source;
deinterlacing received fields from said video source via spatial interpolation when said video source is jittery; and
deinterlacing received fields from said video source via motion adaptive deinterlacing when said video source is not jittery.

8. The method according to claim 5, further comprising determining whether a received field is a top field or a bottom field and deinterlacing said received field via spatial interpolation when it is uncertain whether said received field is a bottom field or a top field.

9. The method according to claim 5, further comprising flushing at least a portion of said stored field without displaying information associated with said flushed at least a portion of said stored field.

10. The system according to claim 5, wherein said at least one processor is operable to determine whether a received field is a top field or a bottom field and deinterlace said received field via spatial interpolation when it is uncertain whether said received field is a bottom field or a top field.

11. A machine-readable storage having stored thereon, a computer program having at least one code section for video signal processing, the at least one code section being executable by a machine for causing the machine to perform steps comprising:
determining if a sufficient number of fields of a video signal have been received to generate a pixel constellation for motion adaptive deinterlacing; and
if an insufficient number of fields have been received to generate a pixel constellation for motion adaptive deinterlacing, repeating display of a particular frame until said sufficient number of fields are available to generate said pixel constellation for motion adaptive deinterlacing, wherein said particular frame is selected from a constant color frame and a frame generated from an initial field of said video signal.

12. The machine-readable storage according to claim 11, wherein every pixel in said constant color frame has the same value.

13. The machine-readable storage according to claim 11, wherein said at least one code section comprises code for generating said particular frame via spatial interpolation of said initial field of said video signal.

14. The machine-readable storage according to claim 11, wherein said at least one code section comprises code for retrieving a pixel value for said constant color frame from a memory.

15. A machine-readable storage having stored thereon, a computer program having at least one code section for video signal processing, the at least one code section being executable by a machine for causing the machine to perform steps comprising:
receiving a first field from a video source;
generating a deinterlaced frame from said received first field; and
displaying said generated deinterlaced frame until a sufficient number of fields have been received and stored to generate a pixel constellation for motion adaptive deinterlacing.

16. The machine-readable storage according to claim 15, wherein said first field is a field for which there is a discrepancy between a provided field type and an expected field type, regardless of whether sufficient fields have been received and stored to generate said pixel constellation for motion adaptive deinterlacing.

17. The machine-readable storage according to claim 15, wherein said at least one code section comprises code for:
detecting jitter in video signals received from a video source:
deinterlacing received fields from said video source via spatial interpolation when said video source is jittery; and
deinterlacing received fields from said video source via motion adaptive deinterlacing when said video source is not jittery.

18. The machine-readable storage according to claim 15, wherein said at least one code section comprises code for determining whether a received field is a top field or a bottom field and deinterlacing said received field via spatial interpolation when it is uncertain whether said received field is a bottom field or a top field.

19. The machine-readable storage according to claim 15, wherein said at least one code section comprises code for flushing at least a portion of said stored field without displaying information associated with said flushed at least a portion of said stored field.

20. A system for video signal processing, the system comprising:
at least one processor comprising a motion adaptive deinterlacer, said at least one processor being operable to:
determine if a sufficient number of fields of a video signal have been received to generate a pixel constellation for motion adaptive deinterlacing; and
if an insufficient number of fields have been received to generate a pixel constellation for motion adaptive deinterlacing, repeating display a particular frame until said sufficient number of fields are available to generate said pixel constellation for motion adaptive deinterlacing, wherein said particular frame is selected from a constant color frame and a frame generated from an initial field of said video signal.

21. The system according to claim 20, wherein every pixel in said constant color frame has the same value.

22. The system according to claim 20, wherein said at least one processor generates said particular frame via spatial interpolation of said initial field of said video signal.

23. The system according to claim 20, wherein said at least one processor retrieves a pixel value for said constant color frame from a memory.

24. A system for video signal processing, the system comprising:
at least one processor comprising a motion adaptive deinterlacer, said at least one processor being operable to:
receive a first field from a video source;
generate a deinterlaced frame from said received first field; and
display said generated deinterlaced frame until a sufficient number of fields have been received and stored to generate a pixel constellation for motion adaptive deinterlacing.

25. The system according to claim 24, wherein said first field is a field for which there is a discrepancy between a provided field type and an expected field type, regardless of whether sufficient fields have been received and stored to generate said pixel constellation for deinterlacing.

26. The system according to claim 24, wherein said at least one processor is operable to:
   detect jitter in video signals received from a video source;
   deinterlace received fields from said video source via spatial interpolation when said video source is jittery; and
   deinterlace received fields from said video source via motion adaptive deinterlacing when said video signal is not jittery.

27. The system according to claim 24, wherein said at least one processor is operable to flush at least a portion of said stored field without displaying information associated with said flushed at least a portion of said stored field.

28. A method for video signal processing, the method comprising:
   receiving a first field from a video source;
   deinterlacing said received first field;
   displaying said deinterlaced received first field until sufficient fields have been received and stored to generate a pixel constellation for deinterlacing;
   flushing at least a portion of said stored fields; and
   deinterlacing and displaying at least one of said flushed fields based on spatial information from said at least one of said flushed fields.

29. A machine-readable storage having stored thereon, a computer program having at least one code section for video signal processing, the at least one code section being executable by a machine for causing the machine to perform steps comprising:
   receiving a first field from a video source;
   deinterlacing said received first field;
   displaying said deinterlaced received first field until sufficient fields have been received and stored to generate a pixel constellation for deinterlacing;
   flushing at least a portion of said stored fields; and
   deinterlacing and displaying at least one of said flushed fields based on spatial information from said at least one of said flushed fields.

30. A system for video signal processing, the system comprising:
   a motion adaptive deinterlacer that receives a first field from a video source;
   said motion adaptive deinterlacer deinterlaces said received first field;
   said motion adaptive deinterlacer presents said deinterlaced received first field for display until sufficient fields have been received and stored to generate a pixel constellation for deinterlacing;
   at least one processor that flushes at least a portion of said stored fields; and
   wherein said motion adaptive deinterlacer deinterlaces and provides for display at least one of said flushed fields based on spatial information from said at least one of said flushed fields.

* * * * *